Oct. 29, 1968  P. P. HARDY  3,407,839
SELF-REGULATING FLUID FLOW VALVES
Filed July 7, 1966  2 Sheets-Sheet 2

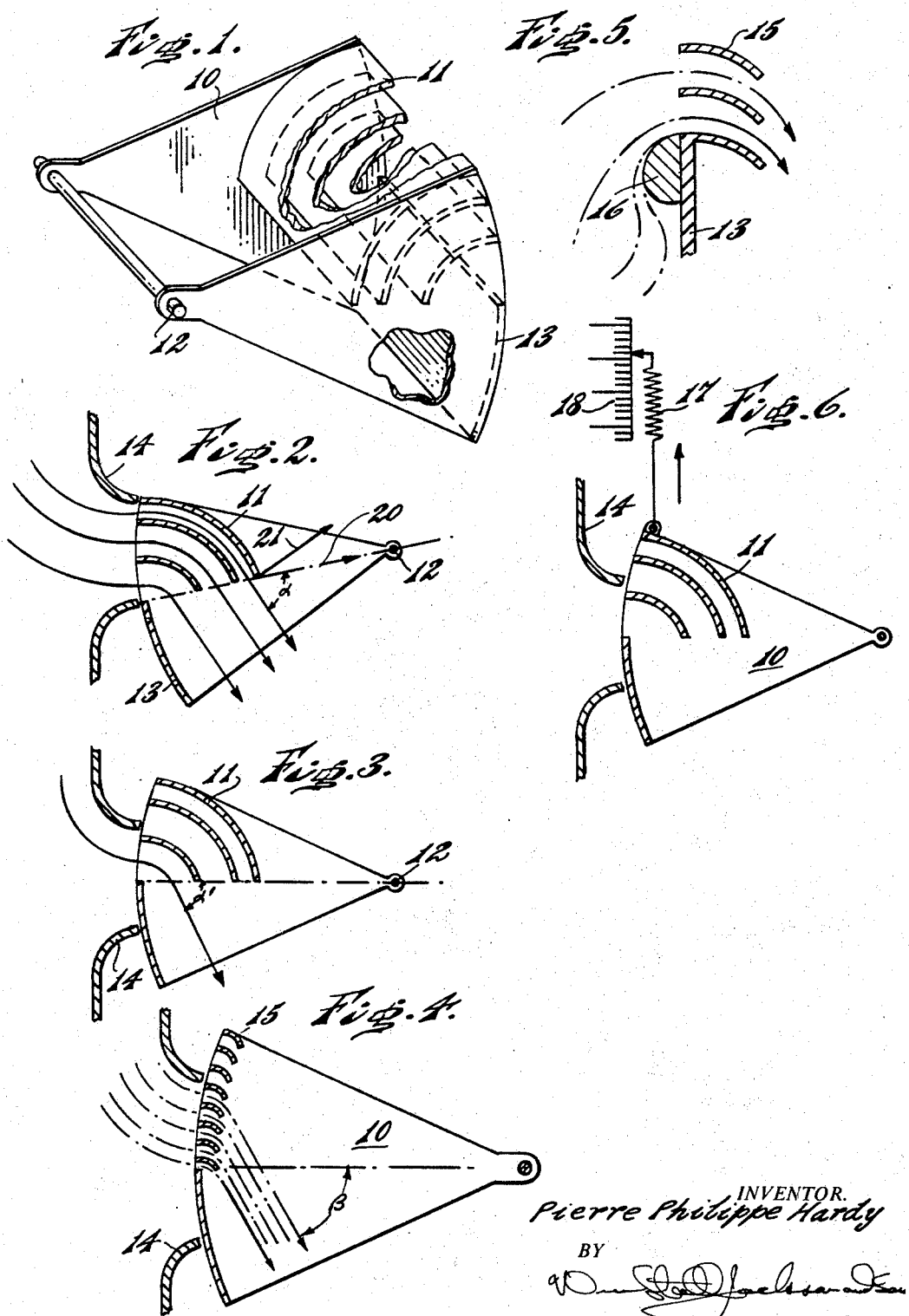

INVENTOR.
Pierre Philippe Hardy
BY
ATTORNEYS

United States Patent Office 3,407,839
Patented Oct. 29, 1968

3,407,839
SELF-REGULATING FLUID FLOW VALVES
Pierre Philippe Hardy, 22 Rue Armengaud,
Saint-Cloud, France
Filed July 7, 1966, Ser. No. 563,415
14 Claims. (Cl. 137—389)

This invention relates to a flow control device and more particularly to a self-regulating constant flow valve.

An object of this invention is to provide a self-regulating valve that compensates for flow variation.

An additional object of this invention is to provide a valve that compensates for flow variation by reducing the valve opening in proportion to the impulsion of the flow.

A further object of this invention is to eliminate the tedious manual adjustment of exit valves due to irregular variations in flow by providing self-compensating valves responsive to the hydrostatic pressure exerted upon them.

Another object of this invention is to provide an adjustable governor for the self-regulating valve to position the valve opening at the desired flow rate.

Heretofore self-regulating valves have had sensing elements such as a plate disposed in the path of a fluid, the plate operating a valve means upstream in response to the pressure of the fluid against it. However, a serious disadvantage of this type of valve is that since the plate pivots with increased pressure, various inclinations of the plate are presented to the flow of fluid. The force exerted on the plate by the flow will be affected by this inclination for when the plate is at an angle to the direction of flow, the force required to pivot the plate further will be greater than if the plate were substantially perpendicular to the direction of flow of the fluid. The valve means will then not close the correct proportional amount to increases in flow of fluid over its entire operative range and thus a constant flow volume control cannot be accurately maintained.

By this invention, applicant has provided a flow control valve wherein the valve means and the pressure sensitive element are part of a single structure, the element creating a closing force for the valve means in response to the pressure of the fluid without the necessity of any mechanical linkage between the element and the means. The pressure sensitive elements of this invention are curved flow deflectors rigidly mounted on a valve body with their concave sides disposed in the path of a fluid emerging from an orifice.

The force of the fluid against these deflectors pivots the valve body about an axis which moves the valve means into a closing position for the orifice. A decrease in the force of the fluid moves the valve means toward an open position. The deflectors move with the pivoting valve body, but since they are curved, the angle of its surface presented to the fluid and hence the angle of deviation of the fluid is substantially the same between open and closed positions of the valve. This avoids the variation in prior art devices caused by inclinations of the pressure sensitive plate and thus the operating or closing force created by the fluid necessary to operate the valve will be the same over all operative positions of the valve. Since the force required to operate the valve will be constant, constant flow volume control can be achieved.

Further objects and advantages will become apparent from the following description of the drawings.

FIGURE 1 is a perspective view partially broken away of the self-regulating flow control valve.

FIGURE 2 is a sectional view of the valve of FIGURE 1 in an open position with respect to an outlet orifice.

FIGURE 3 shows in section the valve body of FIGURE 2 partially closed.

FIGURE 4 shows in section an alternative for the deviators or deflectors of the self-regulating valve.

FIGURE 5 is an enlarged fragmentary view showing in section the use of a water guide on the edge of the obstructor of the valve body of FIGURE 4.

FIGURE 6 shows a valve with a governor for governing the opening of the valve in relation to the force created by the flow of the fluid.

Figure 7:
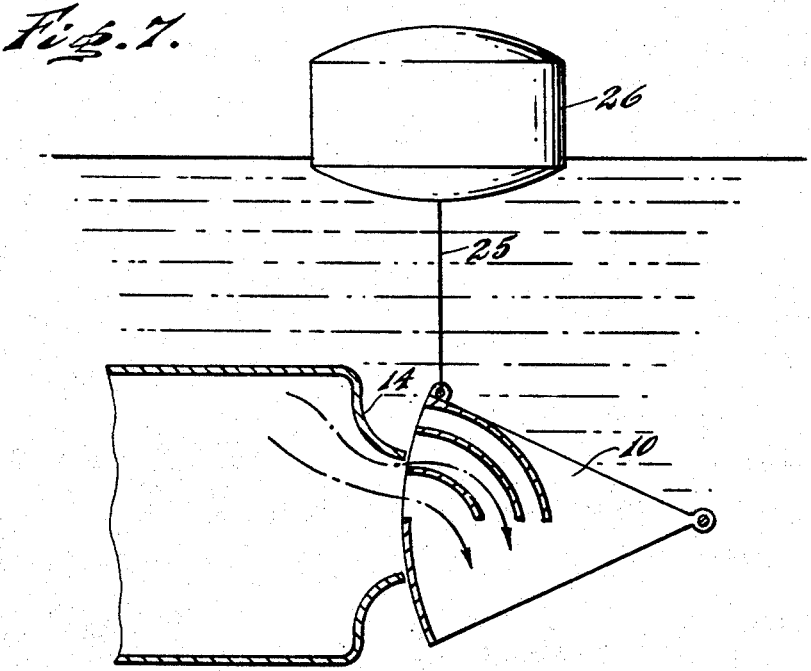
FIGURE 7 shows an alternative form for governing the operation of the valve.

These self-regulating valves are useful in any installation where constant flow is desired. More specifically, they are useful as in irrigating systems or as exit valves for a series of filters placed in parallel along a common collecting channel. Due to the variation of the pressure of the fluid within the filter tanks, for example, the exit flows from these tanks will not all be equal. With the self-regulating valves of the present invention, the exit flow from all these filter tanks can be maintained substantially equal to one another without the necessity of manual adjustment for variation in flow due to changes in the hydrostatic head of each tank as is necessary with conventional exit valves.

The novel valves of this invention compensate flow variation by obstructing the passage of fluid in proportion to the total impulsion or force of the flow exerted on the valve. As the flow of liquid coming into the valve increases, the impulsive force exerted on the valve by the fluid increases, and this increase in force proportionately reduces the orifice of the valve in order to maintain a consant volume of flow. The force exerted by the fluid can be determined by the following expression:

$$F = \rho Q V$$

wherein $\rho$ = the mass volume of the fluid
$Q$ = the volume of flow through the valve
$V$ = the velocity of flow through the valve The valve has been constructed according to the objects of this invention so that the greater the speed of flow the smaller will be the orifice section of the valve and vice versa, the valve thus being able to maintain a constant exit flow from the filter tank.

The valves are suitably provided with governors which proportion the opening of the valve to the above identified force in order to achieve the desired volume of flow. These governors may allow a certain rate of flow in the valve to be reached before the valve begins closing in response to increased forces of flow above that level. If the rate of flow subsequently declines, the valve will reopen again in proportion to the reduction in impulsion in order to keep the flow constant and if the force falls below the setting of the governor, the valve will remain entirely open until that volume of flow is again reached.

Therefore, by regulating in a suitable manner, the relation between the impulsion of the flow and the reduction of the valve's opening it is possible to compensate for any variations in the exit velocity of the fluid so as to maintain a constant flow volume regardless of the load exerted on the valve.

With reference to the drawings and in particular FIGURE 1, there is shown a valve body comprising valve flanges 10 with a plurality of flow deflectors 11 mounted thereon, the valve body being pivotable about axis 12. At the other end of the arc of the segment formed by the flanges and adjacent the deflectors there is a baffle or closure vane 13 adapted to close in varying degrees the outlet orifice 14 of a tank.

As the fluid flows out of the tank and through the valve, it is deflected in the valve and out the bottom thereof by the deflectors or deviators 11 as shown by the arrows in FIGURE 2. As the fluid comes in contact with the deflectors, it creates a force as represented by the vector 20 in FIGURE 2 directed toward the axis of the valve, but because it is deflected by an angle $\alpha$ a closing or component force vector 21 is created. This closing force is proportionate to the actual force created by the force of the fluid by the sign of the angle $\alpha$ which force as noted above is equal to $\rho QV$. This closing force pivots the valve body clockwise about the axis 12 thus closing the valve by bringing the obstructor across the orifice of the outlet of the tank as the flow pressure increases as shown in FIGURE 3. The obstructor or vane 13 lessens the cross sectional area of the outlet orifice in an amount proportionate to the degree of force exerted against the deflectors and thus a constant flow volume for all velocities of flow is maintained.

The fluid comes in contact with the curved flow deflectors in substantially the same manner whether the valve is in an open or closed position and thus the angle of deviation of the fluid remains the same regardless of the position of the valve, therefore the closing force will always be directly proportionate to the force that is exerted on the axis of the valve as represented by the vector 20. The only force acting on the valve is that created by the flow deviators and because little obstruction is actually put in the path of the flow of fluid, the pressure dropped across the deviators is very small.

The deflectors are designed in such a manner as to give a certain angle of deflection to the fluid as it emerges from the orifice. They may be arcs of concentric circles about a common axis or they may simply be concentric curved pieces having varying degrees of curvature. Additionally they may be a series of arcs all having the same radius of curvature.

If the initial cross sectional area of the valve opening is $S_0$ and the valve has been closed to an area $S$, the area of the orifice will have been reduced by $\Delta S$, so that $S = S_0 - \Delta S$. Since the cross sectional area of the valve is to diminish in direct proportion to the increase in load on the valve, then F, the force of the fluid, equals $K\Delta S$ or $F = K(S_0 - S)$ where K is a constant. The flow volume Q is equal to V, the velocity of flow, times the cross-sectional area S of the outlet or orifice of the valve. Therefore, the force exerted on the valve can also be expressed as follows:

$$F = K\left(S_0 - \frac{Q}{V}\right)$$

Since $F = \rho QV$, therefore:

$$QV = KS_0 - \frac{KQ}{V}$$

$$Q\left(\rho V + \frac{K}{V}\right) = KS_0$$

$$Q = \frac{S_0}{\frac{\rho V}{K} + \frac{1}{V}}$$

This expression gives the flow volume at any given velocity as a function of the initial cross sectional area of the valve and the constant K. Since the flow volume is to remain constant between the minimum and maximum velocities, $Q_{max} = Q_{min}$ and thus:

$$\frac{\rho V_{min}}{K} + \frac{1}{V_{min}} = \frac{\rho V_{max}}{K} + \frac{1}{V_{max}}$$

$$\frac{1}{V_{min}} - \frac{1}{V_{max}} = \frac{\rho}{K}(V_{max} - V_{min})$$

$$K = \frac{\rho(V_{max} - V_{min})}{\frac{1}{V_{min}} - \frac{1}{V_{max}}} \left(\frac{V_{min} V_{max}}{V_{min} V_{max}}\right)$$

$$K = \rho V_{min} V_{max}$$

Since the velocity of flow V is equal to the square root of $2gH$ where H equals the hydrostatic pressure of the fluid in the tank and $g$ is the local acceleration due to gravity, the constant K which proportions $\Delta S$ to the force F can thus be determined from the minimum and maximum values of the hydrostatic pressure of the tank.

Therefore $K = \rho 2g\sqrt{H_{min} H_{max}}$

As the force of the fluid increases, because of greater hydrostatic pressure, the proportionating constant will correspondingly decrease the orifice of the valve. As the force or impulsion drops off, the velocity of the fluid thus decreasing, the cross-sectional area of the orifice will increase so that a constant volume will always continue to flow through the valve. The mechanicism for providing this proportionating constant may be any suitable governor such as a spring or float as will hereinafter be described.

A minimum of velocity of flow must first be reached before constant flow volume can be achieved. However, once this value is reached, the proportionating factor K will regulate the necessary adjustments in area and response to increased velocities above this level. In addition, since the valve will never close off completely, the valve's opening will asymptotically approach zero as the velocity increases and thus there will be a minimum and a maximum velocity range over which constant flow is achieved as a direct function of the force F exerted on the axis of the valve.

FIGURE 4 shows a variation for the deflectors of this valve using instead a plurality of thin fins 15 which will deviate the flow of the fluid by the same angle $\alpha$ rather than with the concentric deflectors as described above. With the concentric deflectors, the closing couple or force created is the function of the sign of the angle of deviation. However, while one deflector deviates the fluid at the same angle over its entire length, the deflector having the largest radius of curvature will deviate the fluid at a slightly different angle than will a deflector having a smaller radius. This creates an error in proportionating the volume control of the valve, for when the valve is in the position as shown in FIGURE 3, only the smallest deflector is deviating the flow of the fluid and by a smaller angle, $\alpha'$. While the error is negligible, greater accuracy of the volume control can be maintained between minimum and maximum velocities by providing a series of thin fins 15 in place of the deflectors. These fins all deviate the flow of fluid by the same angle $\beta$ and thus regardless of the position of the valve, the lever action or closing force created by such deviation will always be directed proportional to the velocity of the fluid.

The valve also includes a water guide 16 attached to the baffle plate or obstructor at its upper end. This regularizes the flow of liquid over the end of the obstructor thus eliminating turbulence about that point which would tend to affect the accuracy of the valve. The water guide may, however, present a pressure surface similar to the deflectors and thus create a minute closing force on the valve. It is negligible, though, and in comparison to the force created on the deflectors it will not adversely affect the normal operation of the valve.

To proportion the change in area to the force of the fluid, suitable governors are provided which may require an initial resistance to be overcome before any effect on the valve is made. Additional force created by the fluid above this level will cause the valve to turn on its axis, the amount of turning being proportional to the force created by means of the governing mechanism in order to maintain the constant flow volume.

An elastic member such as an adjustable spring may be provided as shown in FIGURE 6, the proportionality between the force of the fluid and the variation in the orifice size being a function of the stiffness of the spring. Hence, the desired flow rate can be chosen by selecting an appropriate point on the scale 18, thus setting the proper stiffness of the spring.

The spring may work in compression against the force of the fluid or in tension and with it, either way providing the desired proportionating constant. The stiffness of the spring will be a function of the extreme values of the minimum and the maximum hydrostatic pressure of the upstream load and the specific mass of the fluid.

In FIGURE 7, there is depicted an alternative method of governing a valve by means of a float which can be utilized when it is desired to control flow volume of a liquid as a function of the level of fluid in a tank. A float 26 is connected to the valve by means of a stiff rod 25, the float functioning in the same manner as the above described spring in tension. The vertical displacement of the float is proportional to the force exerted against it by the fluid in the tank. As the level of liquid in the tank rises, due to fluid emerging from the orifice 14, the valve will remain open until the level of the float is reached. At that time, the buoyancy force created by the vertical displacement of the float by a further rise in the level of fluid, will create an upward force on the valve, which in conjunction with the force created by the fluid actnig against the valve's deflectors will cause the valve body to pivot. The governor thus acts like a spring in tension, the force acting in favor of the closing of the valve and thus a float may be used in place of the spring to proportion the closing force for the valve to the force of the fluid against the deflectors.

The proportionating constant is calculated according to the cross sectional area of the float, as the greater the cross section, the greater the buoyant force created by the float and thus the less force needed by the emerging fluid to pivot the valve body.

Figure 8:
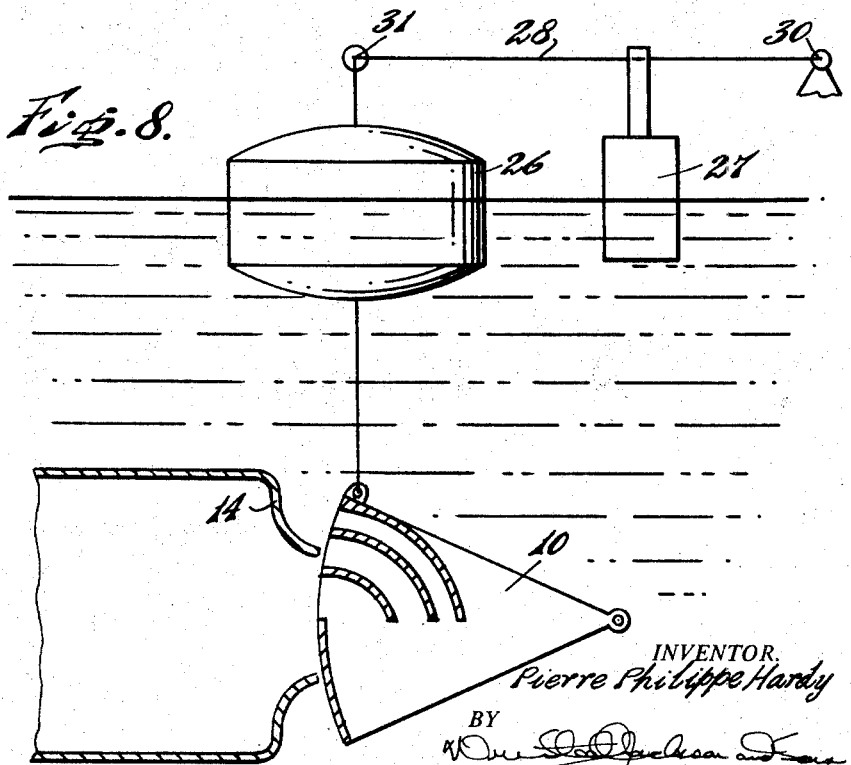
FIGURE 8 shows another alternative form for governing the operation of the valve.

In FIGURE 8, there is shown an alternative method for adjusting this cross section of the float. An auxiliary float 27 of constant cross section is adjustably mounted along rod 28 which rod is pivotally mounted at 30 and pivotally connected to float 26 at 31. By adjusting the float 27 along this rod away from the float 26, the greater the moment arm that is created by the buoyancy of the float 27. This varying buoyancy force added to that of the main float 26 therefore varies the amount of force necessary to close the valve. The auxiliary float permits adjustment of the proportionating factor without the necessity of changing the horizontal cross section of the main float 26.

It will be apparent to those skilled in the art that there are other ways available for providing governors or regulators for the self-regulating flow control valves of this invention.

By regulating in any suitable manner the relation between the impulsion of the flow of the fluid and the reduction of the valve's opening, changes in the variation of the exit speed of the flow can be compensated for so that constant flow volume can be achieved. This can be effectively accomplished if the relationship between the impulsion of the flow and the valve's opening is constant and independent of the load on the valve. By providing curved sensing elements mounted on a pivoting valve body according to the objects of this invention, the force of the flow of fluid regardless of its velocity is maintained directly proportional to the reduction in the valve's orifice because the angle of inclination of the element to the flow of the fluid is always the same between open and closed positions of the valve.

In view of my invention and discolsure variations and modifications to meet individual whim or particular need will doubtless become evident to others skilled in the art, to obtain all or part of the benefits of my invention without copying the structure shown, and I therefore claim all such insofar as they wall within the reasonable spirit and scope of my invention.

Having thus described my invention what I claim as new and desire to secure by Letters Patent is:

1. In a self-regulating fluid flow control device, an outlet orifice for a fluid under pressure, valve means disposed in the path of the fluid flowing from the outlet and adapted to cooperate therewith, said valve means comprising a valve body pivotable about an axis, a plurality of curved flow deflectors mounted on said body to deflect the direction of flow of the fluid as it emerges from the orifice, a closure vane mounted on said valve body and adapted to obstruct the orifice in varying amounts as the valve body pivots; said valve means pivoting about its axis in response to the force exerted by the fluid against the deflectors, the closure vane moving into an obstructing position in an amount proportional to a degree of force created by the fluid against the deflectors.

2. A self-regulating flow control device of claim 1, wherein the fluid acts against the concave side of the curved flow deflectors.

3. A self-regulating flow control device of claim 1, wherein said curved flow deflectors and the obstructor are along an arc adjacent the outlet orifice from and moving about the axis of the valve body.

4. A flow control device of claim 1, wherein said curved flow deflectors are concentric arcs all having the same axis of curvature said axis being substantially normal to the direction of the flow of the fluid.

5. A flow control device of claim 1, wherein said curved flow deflectors aret arcs of a circle each having the same radius of curvature with the axis of curvature of each deflector being substantially normal to the direction of flow of the fluid.

6. A fluid flow control device of claim 1, including governing means operatively associated with said valve means to proportionate the movement of the valve body to the force exerted by the fluid against the deflectors, said governing means additionally preventing movement of said valve until a predetermined level of force of the emerging fluid has been reached.

7. A fluid flow control device of claim 6, wherein said governing means comprises an adjustable spring, the spring constant providing the proportionating factor between the movement of the valve and the force of the fluid.

8. A fluid flow control device of claim 6, wherein said governing means comprises a float within a tank of liquid, the buoyancy of the float providing the proportionating factor between the movement of the valve and the force of the fluid against the deflectors.

9. In a fluid flow control device according to claim 8, an auxiliary float operatively and adjustably associated with said float in order to vary the buoyancy force of the governing means.

10. In a self-regulating fluid flow control device, an outlet orifice for a fluid under pressure, valve means disposed in the path of the fluid flowing from the orifice and adapted to cooperate therewith, said valve means comprising a valve body pivotable about an axis remote from the orifice, a plurality of curved flow deflectors mounted on an arc on said valve body adjacent the orifice with the concavity of the deflectors being disposed in the path of the fluid, a flow obstructor for control of the flow of fluid from the orifice mounted along the arc on said valve body adjacent the orifice next to the concave side of the deflectors, said valve body pivoting in response to the face of the flow of fluid against the concave side of the deflectors, thereby moving the obstructor across the face of the orifice as the flow increases in an amount proportional to the degree of force created by the fluid against the deflectors.

11. A flow control device of claim 10, wherein said curved flow deflectors are a series of fins all having the same curvature disposed along the arc of the valve body adjacent the orifice.

12. A fluid flow control device of claim 10, wherein the curved flow deflectors are a series of concentric arcs having the same axis of curvature said deflectors being disposed along an arc of the valve body adjacent the orifice.

13. A fluid flow control device of claim 10, including a flow deflector on the edge of the obstructor to avoid turbulence about the edge as the obstructor moves between open and closed positions.

14. A fluid flow control device of claim 10, including an adjustable spring acting in compression and tension operatively associated with said valve means to govern the movement of the valve body to the force exerted by the fluid against the deflectors.

References Cited

UNITED STATES PATENTS

| | | | |
|---|---|---|---|
| 2,749,833 | 6/1956 | Hekelaar | 137—499 X |
| 2,803,261 | 8/1957 | Carlson | 137—499 X |
| 3,187,768 | 6/1965 | Waterfill | 137—499 X |

WILLIAM F. O'DEA, *Primary Examiner.*

D. R. MATTHEWS, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,407,839                                                        October 29, 1968

Pierre Philippe Hardy

It is certified that error appears in the above identified patent and that said Letters Patent are hereby corrected as shown below:

Column 3, lines 60 to 63, the equation should appear as shown below:

$$Q = \frac{S_o}{\dfrac{pV}{K} + \dfrac{1}{V}}$$

Signed and sealed this 17th day of March 1970.

SEAL)

attest:

dward M. Fletcher, Jr.
                                                         WILLIAM E. SCHUYLER, JR.

attesting Officer                                                     Commissioner of Patents